US010018242B2

(12) United States Patent
Bradshaw et al.

(10) Patent No.: US 10,018,242 B2
(45) Date of Patent: Jul. 10, 2018

(54) AXIALLY DAMPED HYDRAULIC MOUNT ASSEMBLY

(71) Applicant: Cooper-Standard Automotive, Inc., Novi, MI (US)

(72) Inventors: Jeffery Michael Bradshaw, Bloomfield, MI (US); Chris Dowson, Mitchell (CA)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 0 days.

(21) Appl. No.: 14/719,916

(22) Filed: May 22, 2015

(65) Prior Publication Data

US 2015/0252867 A1    Sep. 10, 2015

Related U.S. Application Data

(63) Continuation of application No. 13/603,524, filed on Sep. 5, 2012, now Pat. No. 9,038,997, which is a continuation-in-part of application No. 13/103,273, filed on May 9, 2011, now abandoned, which is a continuation of application No. 12/865,602, filed as application No. PCT/US2009/033199 on Feb. 5, 2009, now Pat. No. 8,091,871.

(60) Provisional application No. 61/026,291, filed on Feb. 5, 2008.

(51) Int. Cl.
F16F 13/16    (2006.01)
F16F 13/10    (2006.01)

(52) U.S. Cl.
CPC .............. *F16F 13/16* (2013.01); *F16F 13/10* (2013.01); *Y10T 29/49615* (2015.01)

(58) Field of Classification Search
USPC ................. 267/140.13, 140.1, 292, 293; 296/190.01, 190.07, 35.1
See application file for complete search history.

(56) References Cited

U.S. PATENT DOCUMENTS 2,562,195 A * 7/1951 Lee .................... F16F 13/24
                                               267/140.13
3,947,007 A    3/1976 Pelat
4,383,679 A    5/1983 Kakimoto
(Continued)

FOREIGN PATENT DOCUMENTS

EP    0458008    11/1991
FR    2671839    7/1992
(Continued)

OTHER PUBLICATIONS

European Search Report for European Patent Application No. 13183240.4 completed Jun. 22, 2015.
(Continued)

*Primary Examiner* — Thomas J Williams
*Assistant Examiner* — James Hsiao
(74) *Attorney, Agent, or Firm* — Stephen T. Olson; Harness, Dickey & Pierce, P.L.C.

(57) ABSTRACT

An example mount assembly includes a first chamber and a second chamber. The assembly also includes an inertia track having a central opening defining an axis. The inertia track defines a passage in fluid communication with the first chamber and the second chamber. The inertia track is moveable along the axis.

19 Claims, 14 Drawing Sheets

(56) References Cited

U.S. PATENT DOCUMENTS

| | | | |
|---|---|---|---|
| 4,739,979 A * | 4/1988 | Kanda | F16F 13/16 |
| | | | 188/320 |
| 4,741,521 A | 5/1988 | Schiffner et al. | |
| 4,809,960 A | 3/1989 | Kakimoto et al. | |
| 4,832,319 A | 5/1989 | Noguchi et al. | |
| 4,844,430 A | 7/1989 | Miya et al. | |
| 4,856,750 A | 8/1989 | Le Fol | |
| 4,858,896 A | 8/1989 | Colford | |
| 4,871,150 A | 10/1989 | Salver et al. | |
| 4,936,556 A | 6/1990 | Makibayashi et al. | |
| 5,005,810 A | 4/1991 | Sawada et al. | |
| 5,040,775 A | 8/1991 | Miyakawa | |
| 5,158,269 A | 10/1992 | Hein et al. | |
| 5,165,669 A | 11/1992 | Mayerbock et al. | |
| 5,195,728 A | 3/1993 | Skipper | |
| 5,277,410 A * | 1/1994 | Oshima | F16F 13/24 |
| | | | 267/140.11 |
| 5,474,284 A | 12/1995 | Hamaekers et al. | |
| 5,501,434 A * | 3/1996 | McGuire | B64C 27/51 |
| | | | 267/140.11 |
| 5,687,959 A | 11/1997 | Rudolph | |
| 5,690,320 A | 11/1997 | Kanda | |
| 5,842,677 A | 12/1998 | Sweeny et al. | |
| 5,890,706 A | 4/1999 | Court | |
| 5,947,455 A | 9/1999 | Mikasa et al. | |
| 5,996,959 A | 12/1999 | Gassen et al. | |
| 6,029,961 A | 2/2000 | Meyerink et al. | |
| 6,557,836 B2 | 5/2003 | Itoh | |
| 6,644,633 B2 | 11/2003 | Graeve | |
| 6,651,965 B1 | 11/2003 | Vossel et al. | |
| 6,981,696 B2 | 1/2006 | Hatano et al. | |
| 7,922,156 B2 | 4/2011 | Goudie | |
| 2002/0079633 A1 | 6/2002 | Miyamoto | |
| 2009/0166939 A1 | 7/2009 | Goudie et al. | |
| 2009/0174127 A1 | 7/2009 | Sugimoto | |
| 2009/0321202 A1 | 12/2009 | Hamada et al. | |
| 2010/0213651 A1 | 8/2010 | Hori et al. | |
| 2013/0038006 A1 | 2/2013 | Saito | |
| 2013/0069288 A1 | 3/2013 | Saito | |

FOREIGN PATENT DOCUMENTS

| | | |
|---|---|---|
| JP | S61165040 A | 7/1986 |
| WO | 2009100205 | 8/2009 |

OTHER PUBLICATIONS

International Search Report and Written Opinion for PCT/US2009/033199.

Australian Patent Examination Report No. 1, dated Nov. 18, 2016.

Extended European Search Report regarding Application No. 09708340.6, dated Jul. 31, 2017.

Examination Report regarding European Application No. 13183240.4, dated Oct. 31, 2017.

* cited by examiner

AXIALLY DAMPED HYDRAULIC MOUNT ASSEMBLY

REFERENCE TO RELATED APPLICATIONS

This application is a continuation of U.S. application Ser. No. 13/603,524, filed Sep. 5, 2012, which is a continuation-in-part of U.S. application Ser. No. 13/103,273 filed May 9, 2011, which is a continuation of U.S. application Ser. No. 12/865,602 filed Nov. 15, 2010 now U.S. Pat. No. 8,091,871, which is a National Phase application of PCT Application No. PCT/US2009/033199 filed Feb. 5, 2009, which claims priority to U.S. Provisional Application No. 61/026,291 filed Feb. 5, 2008.

BACKGROUND OF THE DISCLOSURE

This disclosure relates to a mount assembly or damper, and particularly a mount assembly that damps vibrations imposed on the assembly in a load bearing environment, including a fluid effect damping that is a combination of frequency dependent resonant damping and broadband viscous damping.

Assemblies that damp vibrations and relative movement between components are well known. Many of these arrangements use an elastomer or natural rubber material disposed between first and housing portions that are secured to first and second vehicle components. It is desirable to limit vibration from the first component to the second component, for example, between a first component such as an automotive frame and a second component such as an engine. For example, an engine mount assembly includes a first housing portion mounted to the frame and a second housing portion secured to the engine and a material such as an elastomer or rubber interposed between the first and second housing portions that damps the vibrations.

When a component in a system is excited at its natural frequency, it can begin vibrating at high amplitudes. These high amplitude vibrations can be transferred from the origin of the excitation through a conventional mount to the side of the system where vibrations are not desirable. An axially damped hydraulic mount can be tuned to the natural frequency of the system and can reduce the transfer of vibrations from one side of the system to the other.

Other axially damped hydraulic mounts are known in the art. Moreover, it is also known to use a true double pumping hydraulic mount in which a hydraulic fluid is selectively conveyed between first (upper) and second (lower) chambers that are interconnected by an elongated path (inertia track). However, these types of hydraulic mounts have some functional limitations because of the need to secure the hydraulic mount via the housing to the surrounding environment.

It is also desirable to use the mount as a load bearing mount, or in combination with a typical shear style body mount in a rebound application, or an engine mount, or suspension mount application. Further, if used in such a combination, undue complexity in the assembly and sealing should also be avoided.

SUMMARY OF THE DISCLOSURE

A hydromount assembly includes first and second chambers separated by an inertia track having a passage that communicates with the chambers. An opening through a central portion of the inertia track is dimensioned to receive an associated fastener therethrough.

A hollow shaft extends through the first and second chambers and the inertia track, such that axial movement of the shaft results in axial movement of the inertia track to selectively pump fluid from one of the first and second fluid chambers to the other of the fluid chambers.

The inertia track is secured about an outer perimeter portion to an elastomeric material allowing the inertia track to selectively move in response to movement of the shaft that extends through the opening.

The inertia track preferably includes first and second portions separated along a plane perpendicular to an axis of the central portion opening.

The inertia track is secured about an outer perimeter portion to an elastomeric material allowing the inertia track to selectively move in response to movement of a shaft extending through the opening.

First and second, or first, second and third elastomeric elements have the same or different conformations or are formed from the same or a different material than one another.

A housing is received around the first and second fluid chambers and the inertia track, and a portion of the housing is crimped to compress inner perimeter portions of the inertia track and create a fluid seal.

An alternate sealing method comprises forming the inertia track from two stamped metal pieces and using the outer metal of the center molded component to crimp the upper and lower molded components.

A primary benefit of the disclosure relates to mounting through the center of the hydromount to significantly increase the functionality of the damper.

Another benefit resides in using the inertia track as a plunger that actuates fluids between the first and second fluid chambers to create a frequency dependent fluid effect damping.

Ease of assembly and a simplified manner of sealing the components together is also provided by the present disclosure.

An example mount assembly includes a first chamber, at least partially defined by a first elastomeric element and a second chamber, at least partially defined by a second elastomeric element. The assembly also includes an inertia track having a central opening defining an axis. The inertia track defines a serpentine passage in fluid communication with the first chamber and the second chamber. The inertia track is moveable along the axis relative to the first elastomeric element and the second elastomeric element.

An example mount assembly includes a first chamber, at least partially defined by a first elastomeric element and a second chamber, at least partially defined by a second elastomeric element. The assembly also includes an inertia track having a central opening defining an axis. The inertia track defines at least one passage in fluid communication with the first chamber and the second chamber. The inertia track is moveable along the axis relative to the first elastomeric element and the second elastomeric element. The assembly includes a hollow tube that seals against an axial end of the inertia track on a second chamber side.

An example mount assembly includes a first chamber, at least partially defined by a first elastomeric element and a second chamber, at least partially defined by a second elastomeric element. The assembly also includes an inertia track having a central opening defining an axis. The inertia track defines at least one passage in fluid communication with the first chamber and the second chamber. The inertia track is moveable along the axis between the first chamber and the second chamber. The assembly includes a shaft defining a shoulder that abuts a first axial end of the inertia track and a hollow tube that seals against a second axial end of the inertia track.

Still other features and benefits will be found in the following detailed description.

DETAILED DESCRIPTION OF THE PREFERRED EMBODIMENTS

Figure 1:
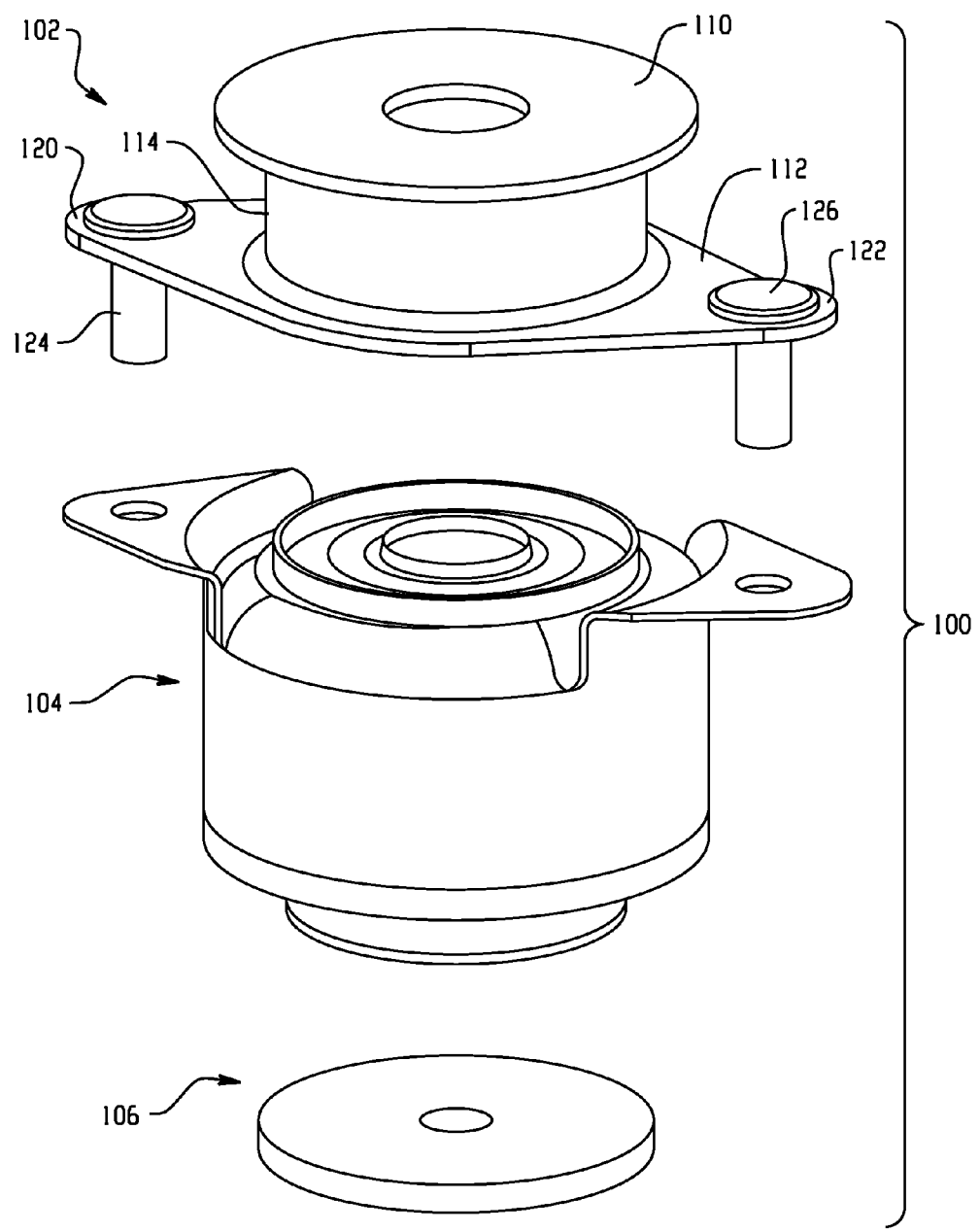
FIG. 1 is an exploded view of a three piece hydraulic body mount assembly.
Figure 2:
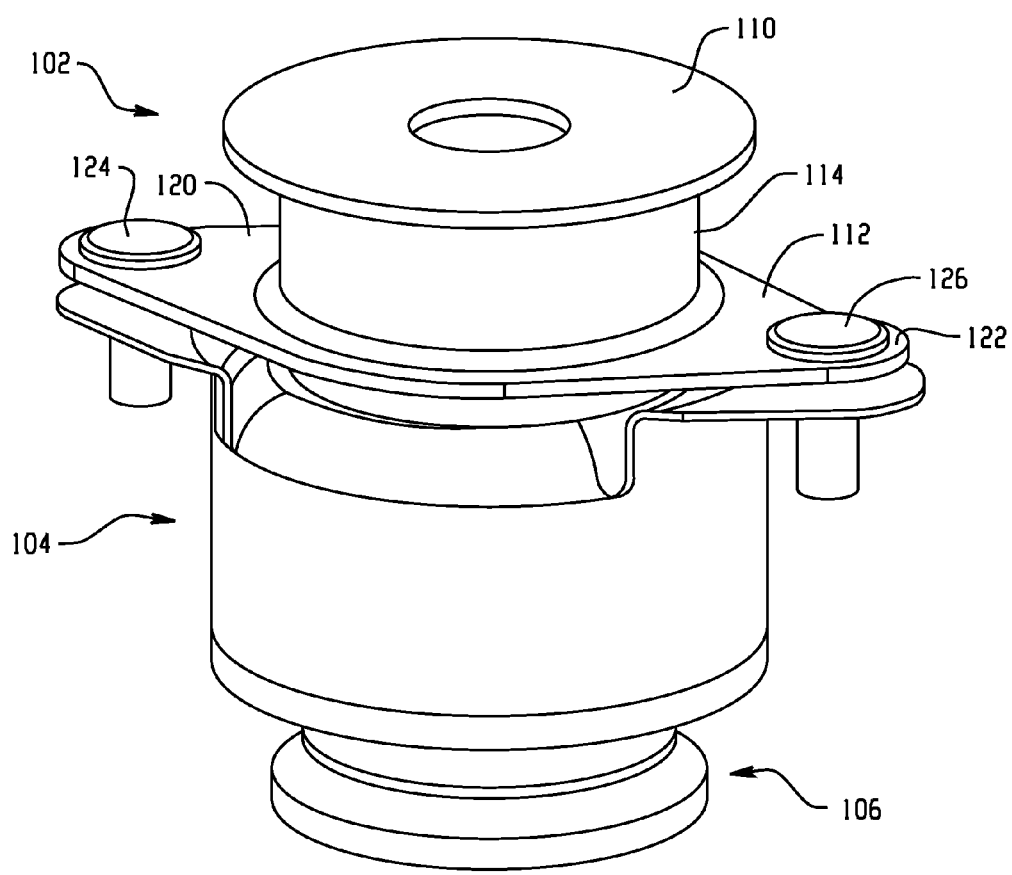
FIGS. 2 and 3 are perspective views of the assembled hydraulic body mount assembly of FIG. 1.
Figure 3:
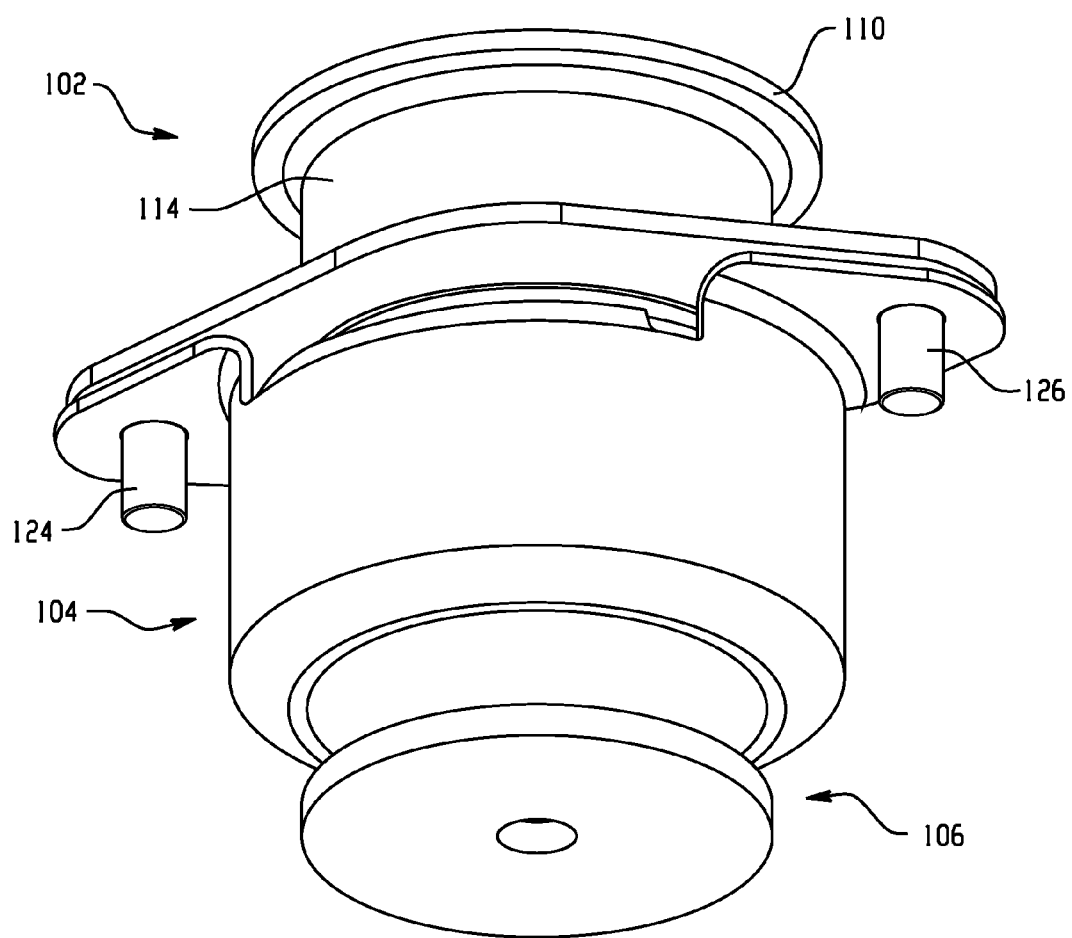

Turning first to FIGS. 1-3, a mount assembly or damper 100 is illustrated. A preferred embodiment of a mount assembly 100 includes a load bearing body mount 102, a hydraulic damper 104, and a travel restricting washer 106. The assembly 100 allows for a fastener such as a bolt (not shown) to pass through the center of the hydraulic damper, and in this case the body mount, while still creating damping in the axial direction. More particularly, the load bearing body mount 102 includes an upper, first component such as bearing plate 110 spaced from a lower, second component or mounting plate 112. The load bearing body mount further includes a damping member (sometimes referred to as a main rubber element or MRE) such as an elastomeric material or natural rubber 114 that is secured at opposite ends to the first component 110 and the second component 112, respectively. For example, the damping member may be mold bonded to the plates 110, 112 in a manner well know in the art. The mounting plate preferably includes first and second flanges 120, 122 that extend laterally outward and include openings that receive fasteners 124, 126, respectively. As perhaps best evident in FIG. 7, the body mount further includes a central hollow rigid sleeve 130 that extends through the elastomeric member and is mold bonded along an external surface thereof with the elastomeric member. The rigid components of the mount (e.g., plates 110, 112 and sleeve 130) are preferably formed from any suitably hard material (composite, aluminum, steel, etc.), and any suitably performing compliant substance (generally referred to as an elastomer which includes an elastomer, natural rubber, etc.) can be used in the compliant portion of the system. The plate 110 and the sleeve 130 are preferably formed from separate metal components that are subsequently joined (e.g., welded) together for ease of assembly, although it will be understood that the sleeve and the plates 110, 112 may be formed from the same type of rigid material (for example, metal) or from a rigid composite material. Further, the bearing plate 110 and the sleeve 130 could be a deep drawn integral or homogeneous structural arrangement, however, the least expensive arrangement is to form the bearing plate and sleeve as separate components, and subsequently join the individual components together.

Figure 4:
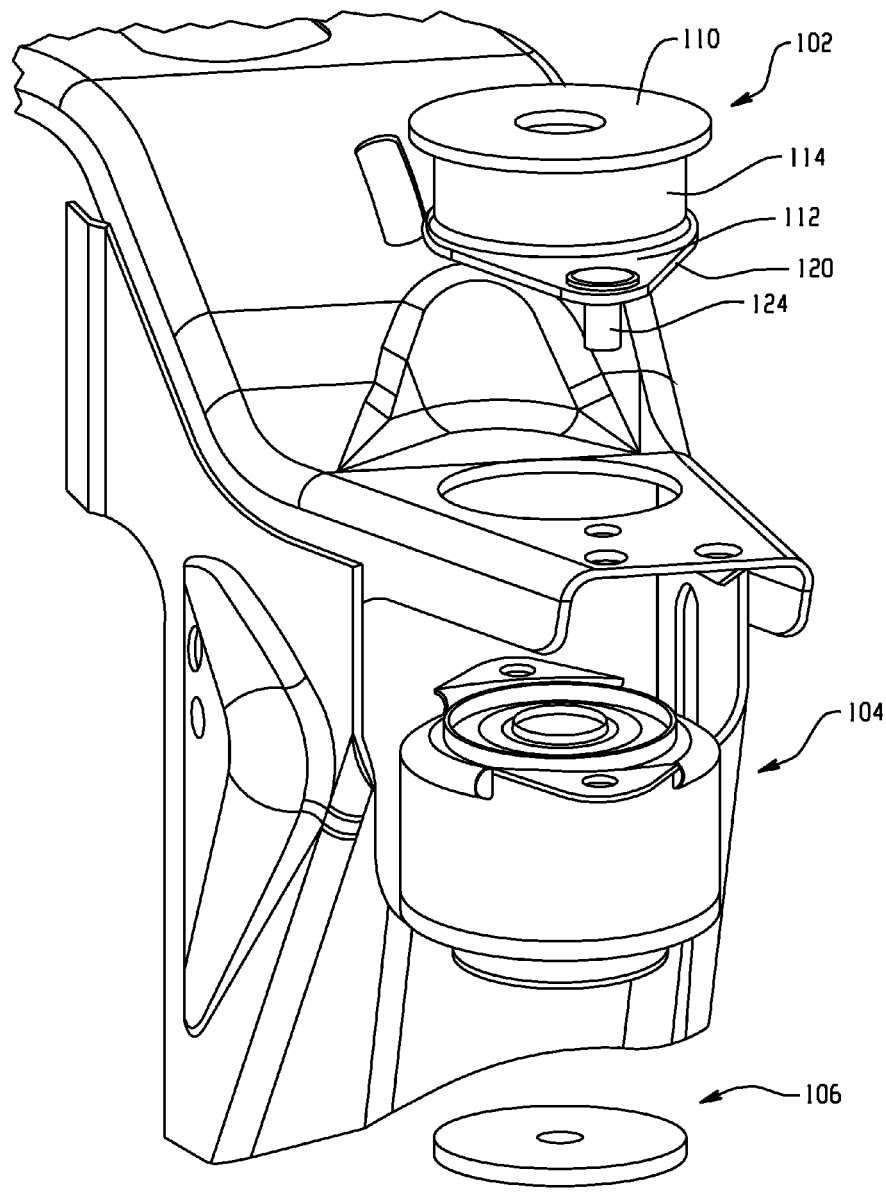
FIGS. 4 and 5 are exploded and installed views of the hydraulic mount assembly of FIGS. 1-3 in a shear style body mount design.
Figure 5:
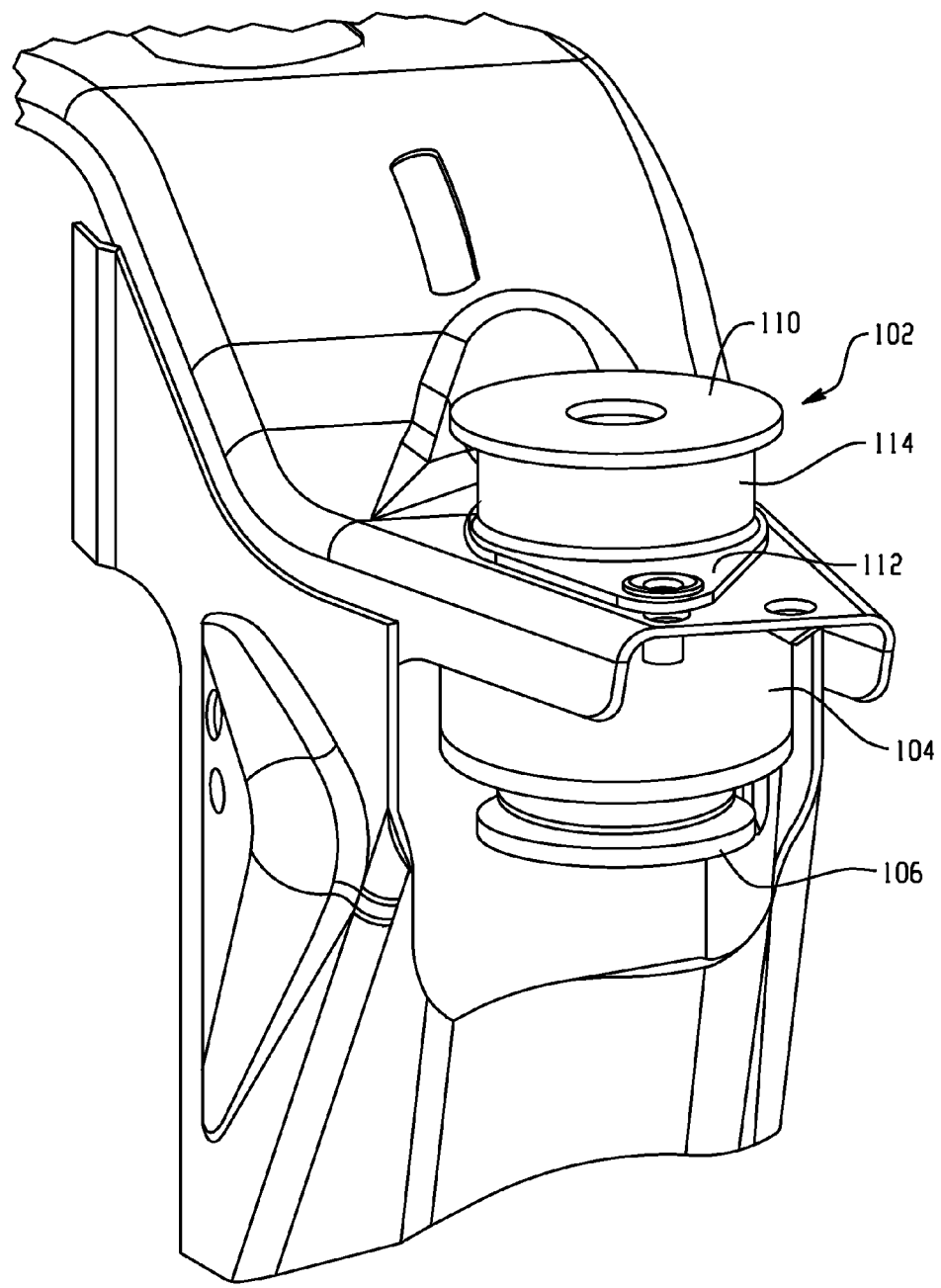
Figure 6:
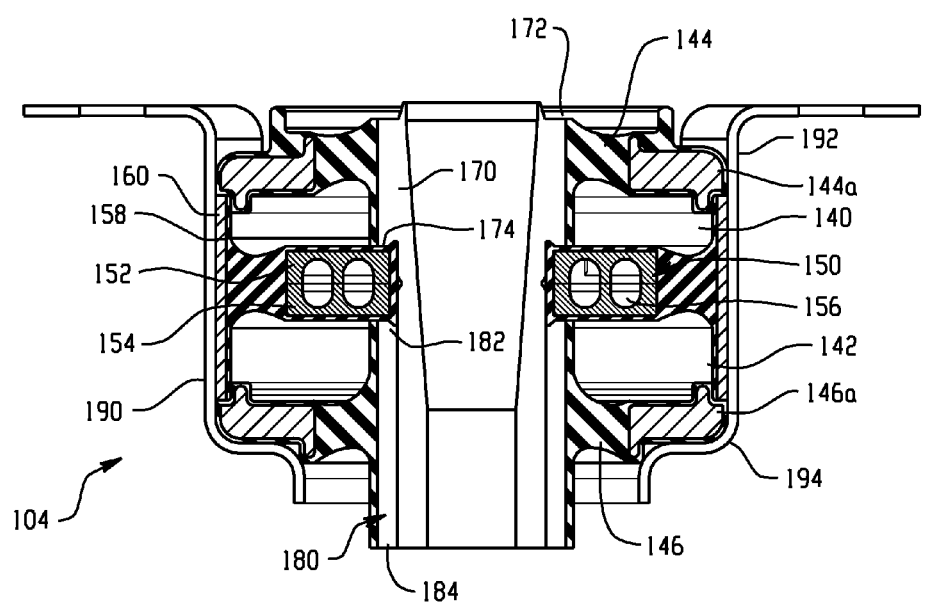
FIG. 6 is a longitudinal cross-sectional view of the double pumping hydraulic damper or hydromount assembly.
Figure 7:
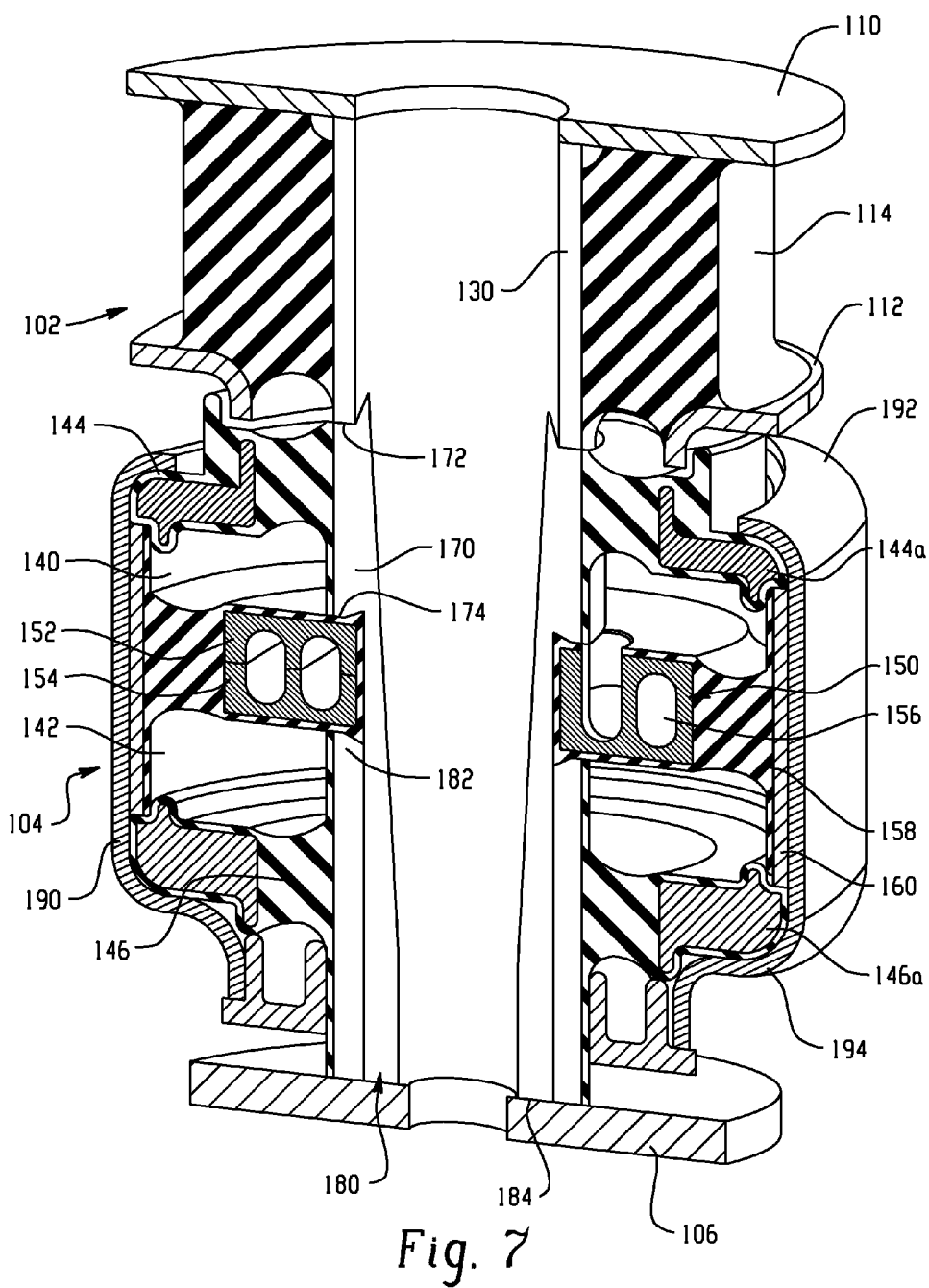
FIG. 7 is a longitudinal cross-sectional view of the three-piece hydraulic body mount assembly.

The hydraulic damper or hydromount 104 is illustrated in FIGS. 1-5 and more particular details are shown in the cross-sectional views of FIGS. 6 and 7. The hydraulic damper is a "double pumper" design where hydraulic fluid is forced back and forth by the pumping action of opposing elements, i.e., upper and lower fluid chambers 140, 142. The concept of a double pumping hydraulic mount is known in the art; however, what makes this preferred arrangement unique is that the hydraulic damper 104 allows for a fastener such as a mounting bolt (not shown) to extend through the hydraulic damper without adversely impacting the functional operation of the hydraulic damper portion of the assembly. Particularly, in the illustrated preferred embodiment, an upper or first main rubber element (MRE) 144 forms a first or upper end of the upper fluid chamber 140 and similarly a lower or second main rubber element 146 for a first or lower end of the lower fluid chamber 142. The first and second fluid chambers are separated by an inertia track 150 which is an elongated, preferably serpentine interconnecting passage that ads in damping vibrations between the upper and lower ends of the hydromount. For example, the inertia track is typically a stationary component that has a winding path shown here as being formed from first and second stamped components 152, 154 that abut against one another, and together form a continuous passage 156. The passage 156 communicates with the upper fluid chamber 140 at one end and with the lower fluid chamber 142 at the other end. Vibrations are damped by the inertia track in a manner well known in the art and in addition this structural arrangement provides for viscous fluid damping where the fluid flow through the passage is limited due to the cross-sectional dimension of the passage and thereby provides the viscous fluid damping between the first and second fluid chambers. In the present arrangement, the inertia track 150 is a movable component that spans between the first and second fluid chambers and is resiliently mounted about an outer peripheral portion with elastomer sidewall 158. The sidewall 158 may be formed at least partially from a rigid component such as a generally cylindrical rigid element or sidewall 160, and likewise portions of the end 144 of the first fluid chamber 140 and the end 146 of the second fluid chamber 142 may include rigid components 144a, 146a. Preferably, however, the remainders of the first and second fluid chambers are formed from an elastomeric/rubber material so that the ends 144, 146 may selectively move or deflect and cause a pumping action of the fluid through the inertia track passage and between the first and second chambers.

Further, a rigid inner hollow shaft 170 extends through the hydromount and is adapted to receive a fastener (not shown) therethrough. As seen in FIG. 7, the shaft 170 in the hydromount preferably aligns with the sleeve 130 in the body mount in order to easily assemble these damping components together. An opening through shaft is shown as preferably having a tapered conformation that decreases in size as the shaft extends axially from the first fluid chamber to the second fluid chamber. A first shoulder 172 is dimensioned to abuttingly engage and align the shaft with the sleeve at the upper end of the hydromount. A second shoulder 174 is dimensioned to abuttingly and sealingly engage the inertia track, namely a first or upper surface thereof, at a radial inner location. As a result of molding the inertia track in an elastomeric material, the elastomeric material at this inner radial location serves as a seal between the shaft second shoulder 174 and the inertia track 150. Similarly, a rigid hollow tube 180 is received over the other end of the shaft so that a first end 182 of the tube seals against a second or underside surface of the inertia track at the inner radial location. In this manner, the first and second fluid chambers are sealed from one another along the inner radial region as a result of the shaft second shoulder and the tube 180. A second end 184 abuts against the washer 106.

The hydromount further includes a rigid, metal housing (sometimes referred to as a can or shell) 190 that encompasses the separately molded first and second main rubber elements 144, 146 disposed at axial opposite ends of the first and second fluid chambers 140, 142, and the separately molded inertia track. Preferably, a first or upper end 192 of the housing sealingly engages the first main rubber element 144 and by deforming or crimping the first end 192 radially inward, the hydromount is sealed at the first/upper end. That is, the housing first end seals against an outer peripheral region of the first main rubber element 144. An inner peripheral region of the first main rubber element, that preferably includes rigid insert 144*a*, is sealed or mold bonded to a radial outer surface of the shaft 170 to form a first subassembly of the hydromount assembly. The second main rubber element 146, which also preferably includes the rigid insert 146, is sealed (preferably by mold bonding) to an outer peripheral surface of the tube 180 to form a second subassembly of the hydromount assembly. A second or lower end 194 of the housing receives the second subassembly or second main rubber element therein. Rigid sidewall 160 is connected to an outer periphery of the inertia track via an elastomeric material that is preferably mold bonded thereto to form a third subassembly. The elastomeric material preferably extends along the entire height or interior surface of the sidewall 160 so that when assembled in the housing, the sidewall forms outer peripheral portions of the first and second fluid chambers and axially spans and seals against the first main rubber element 144 at a first or upper end to the second main rubber element 146 at a second or lower end.

To assemble the hydromount, the sidewall 160 is advantageously located in a mold with the first and second components 152, 154 of the inertia track to form one of the molded subassemblies. The first main rubber element is molded to an external surface of the shaft to form another of the molded subassemblies. Likewise, the second main rubber element is molded to an external surface of the tube to form still another of the molded subassemblies. The three subassemblies are introduced into the housing one atop another and the second shoulder abuttingly seals against the upper, inner peripheral portion of the inertia track and the tube is pressed over the shaft to compress and seal along a lower, inner peripheral portion of the inertia track. A single deformation or crimp is formed in the housing at the first end 192 with the three subassemblies received in position in the housing to compress the housing against the first main rubber element, and likewise compress the three subassemblies together.

Figure 8:
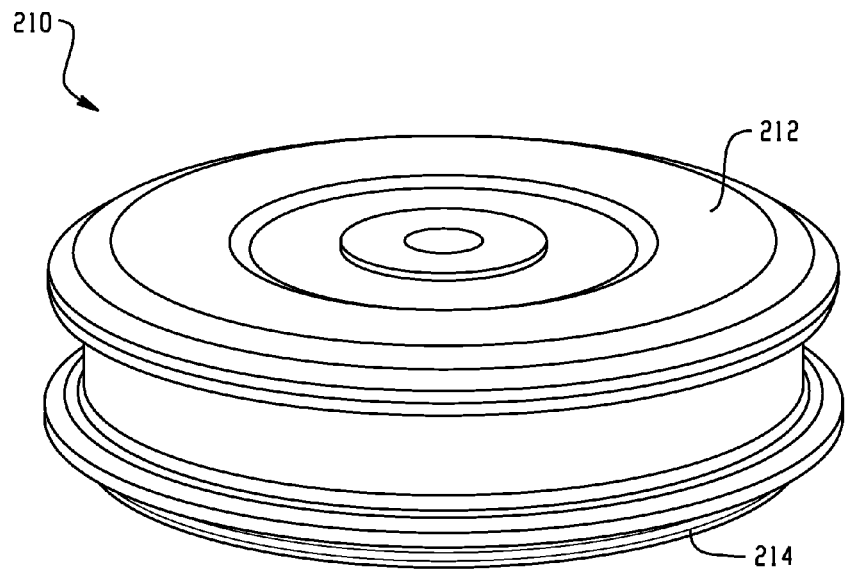
FIG. 8 is a perspective view of a center-fastened double pumping hydromount assembly.
Figure 9:
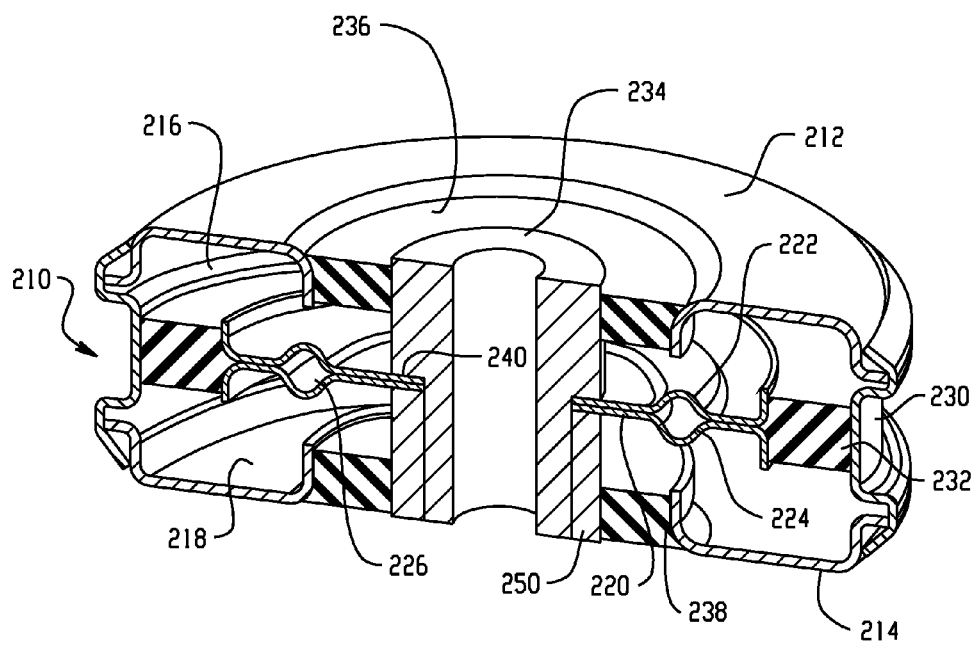
FIG. 9 is a longitudinal cross-sectional view of the hydromount assembly of FIG. 8.

As illustrated in FIGS. 8 and 9, an alternative hydromount assembly 210 that a first or upper molded component 212 and a second or lower molded component 214, that form a first/upper portion of a first fluid chamber 216 and a second/lower portion of a second fluid chamber 218, respectively. The fluid chambers are in fluid communication via an inertia track 220 that includes first and second stamped metal inertia track portions 222, 224, for example, that abut one another to form an elongated inertia track passage 226 that communicates with the first fluid chamber at one end and the second fluid chamber at the other end. A third or center molded component 230 is radially spaced and interconnected with the inertia track portions 222, 224 by an annular elastomeric or rubber member 232 that is preferably secured (e.g., mold bonded) along an inner periphery to the metal components and along an outer periphery to the third molded component 230 to form one of the subassemblies. A second molded subassembly includes shaft 234 molded along an outer surface thereof to an inner perimeter portion of a second annular elastomeric/rubber member 236, and an outer perimeter portion of the second rubber element 236 is mold bonded to the molded component 212 to form a second subassembly. A third annular elastomeric/rubber member 238 is molded along an outer perimeter portion with the inner surface of the second molded component 214 and also molded along an inner perimeter portion with a tube 250. Further, the shaft includes a shoulder 240 that abuttingly engages and seals with an inner diameter region of the inertia track. Likewise, a sleeve 250 is press fit over the shaft 240 and the sleeve abuttingly engages an underside of the inertia track to seal thereagainst. The center molded component includes flanges at opposite axial ends that are crimped or deformed into locking engagement with outer peripheries of the first and second molded components to hold the three subassemblies together in a single assembly.

Figure 10:
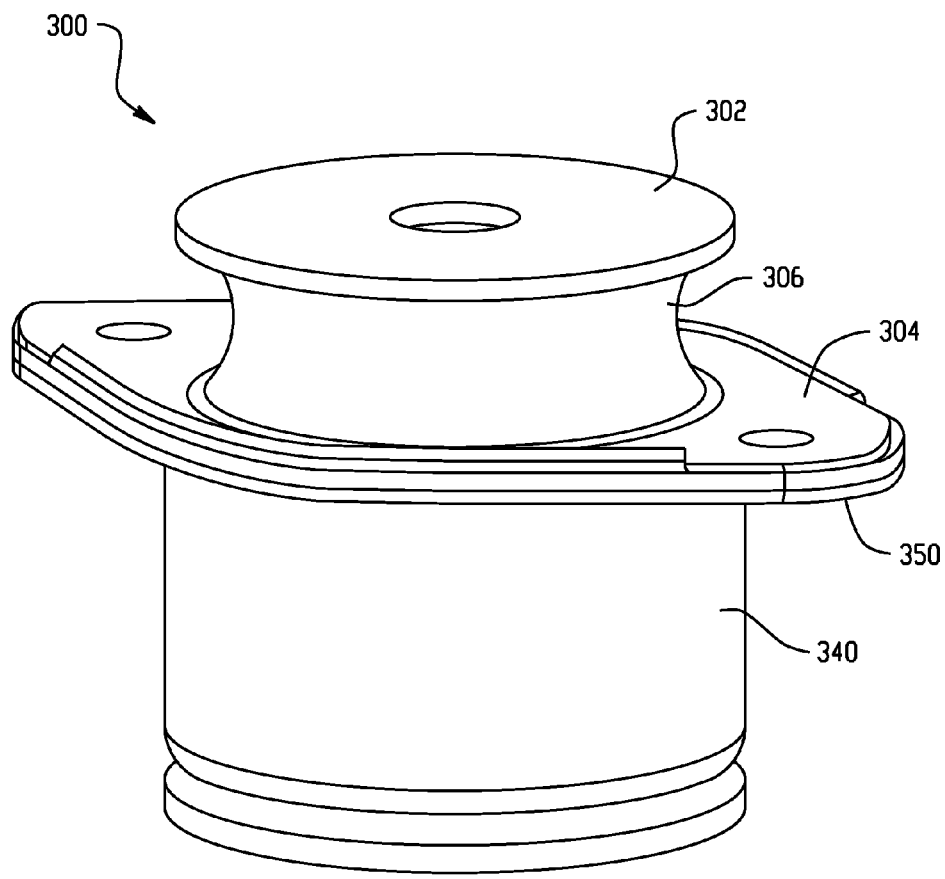
FIG. 10 is a perspective view of another embodiment of a hydraulic body mount assembly.
Figure 11:
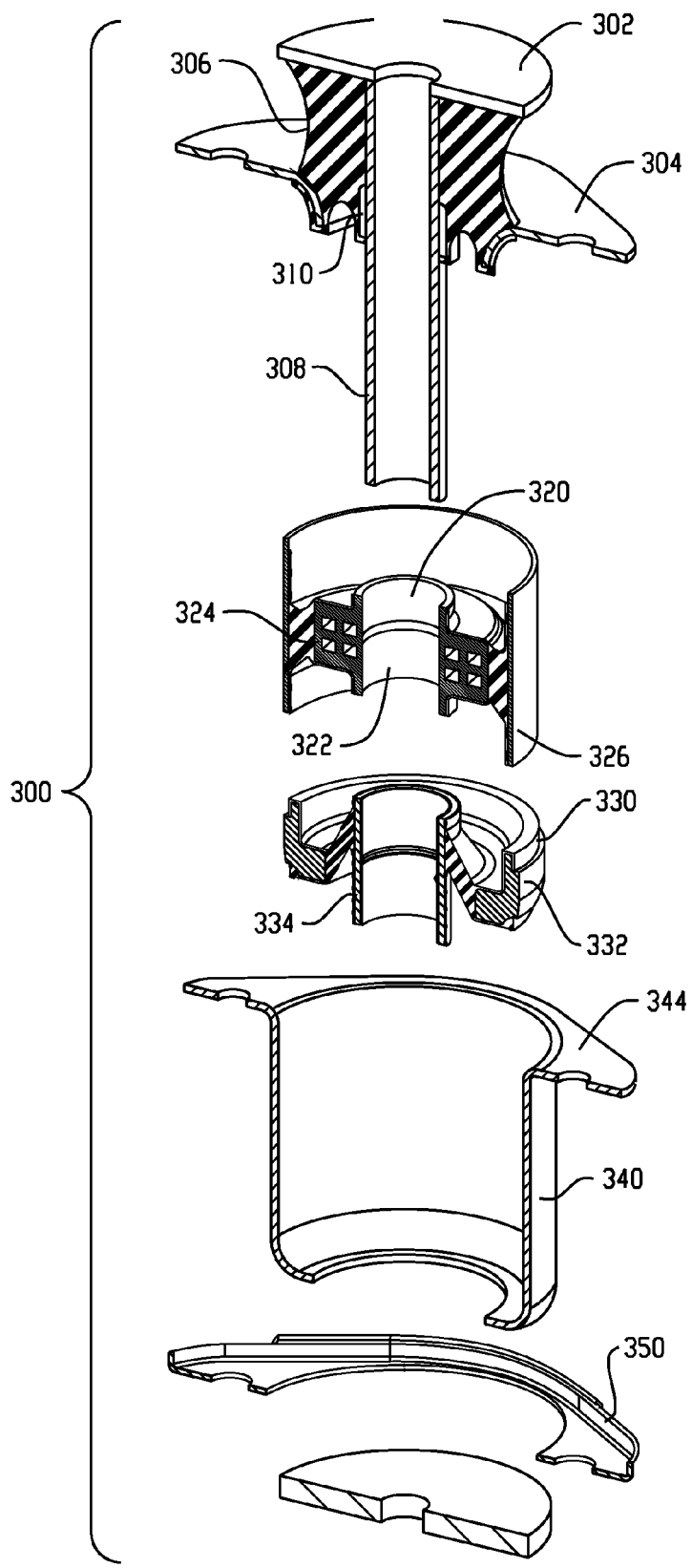
FIG. 11 is an exploded view of the mount assembly of FIG. 10.
Figure 12:
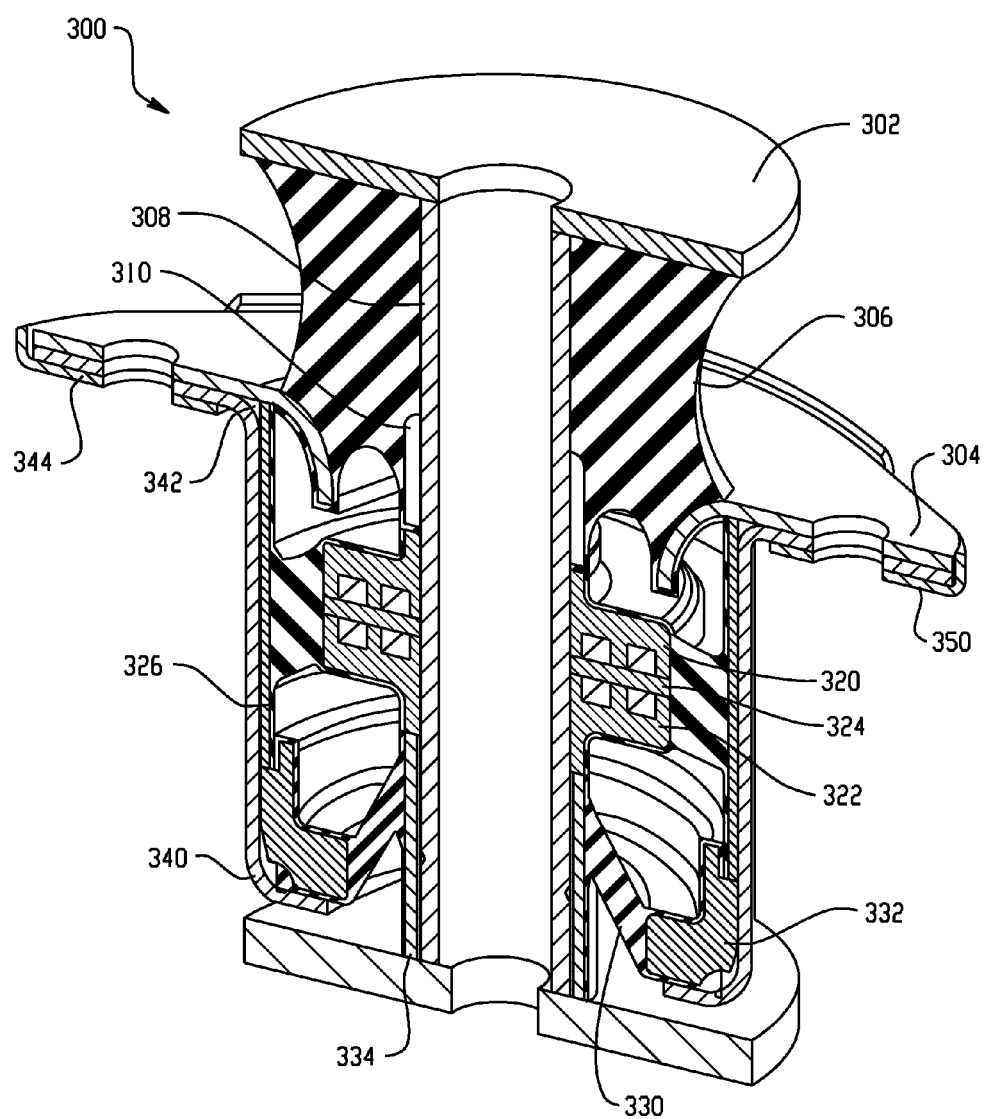
FIG. 12 is a longitudinal cross-sectional view of the mount assembly of FIG. 10.

FIGS. 10-12 have similar structures and functions to the previously described embodiments. Again, separately molded subassemblies are compressed together in a housing, although in this arrangement, the body mount is integrated into the first main rubber element. More specifically, body mount 300 includes an upper, first component or bearing plate 302 spaced from a lower, second component of mounting plate 304. The plates 302, 304 are spaced by a first main rubber element 306 which also serves to form an upper surface of the first fluid chamber. The first main rubber element is molded to the two plates 302, 304, and also to shaft 308 extending downwardly from a first or lower surface of the plate 302. If desired, rigid ring member or tube 310 is molded in the rubber element 306 along a lower, inner perimeter portion of the first rubber element.

The second subassembly includes a three-piece inertia track assembly which extends the length of the passage almost two-fold in comparison to the passages of the prior embodiments by using inner and outer radial passages formed in a first or upper portion 320, a second or lower portion 322, and a separating plate 324 that has an opening that connects passage portions in the upper inertia track portion 320 with the passage portions in the lower inertia track portion 322. Sidewall 326 has an inner surface that is molded to the inertia track assembly by an elastomeric member that preferably encompasses the three-part inertia track assembly.

The third subassembly includes a second main rubber element 330 that preferably includes a rigid insert 332 along an outer radial portion and is molded to a tube 334 along an inner radial portion. The third subassembly in conjunction with the inertia track portion forms the second or lower fluid chamber.

Housing 340 receives the third subassembly, then the inertia track subassembly, and then the first subassembly through an open top 342. The housing further includes a radially extending flange 344 that abuts with a lower or underside surface of the mounting plate 304. A crimping member 350 then joins the flange 344 and plate 304 together to press the first, second and third subassemblies together in sealed relation in the housing.

Figure 13:
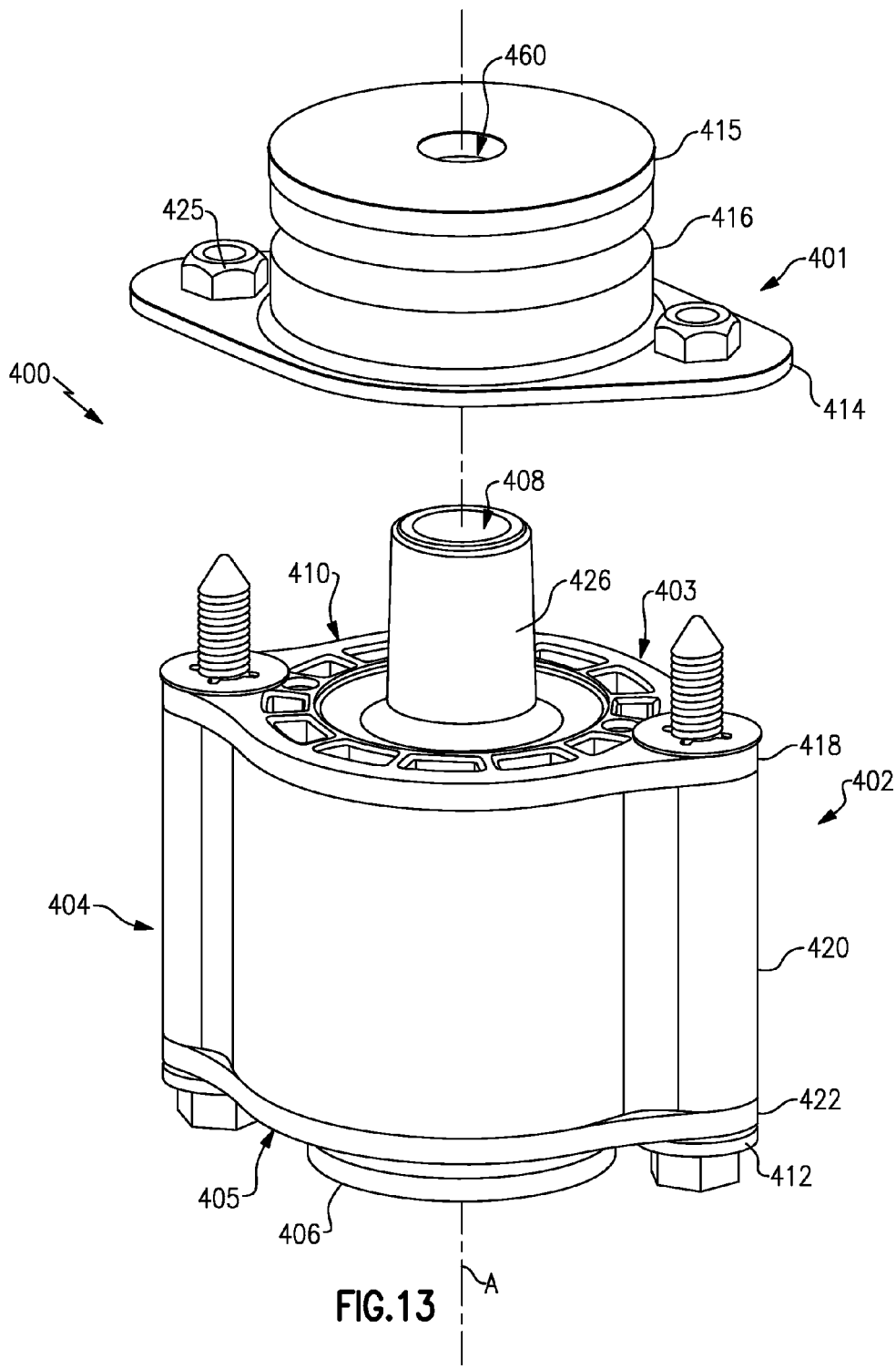
FIG. 13 is a perspective view of another embodiment of a hydraulic body mount assembly.
Figure 14:
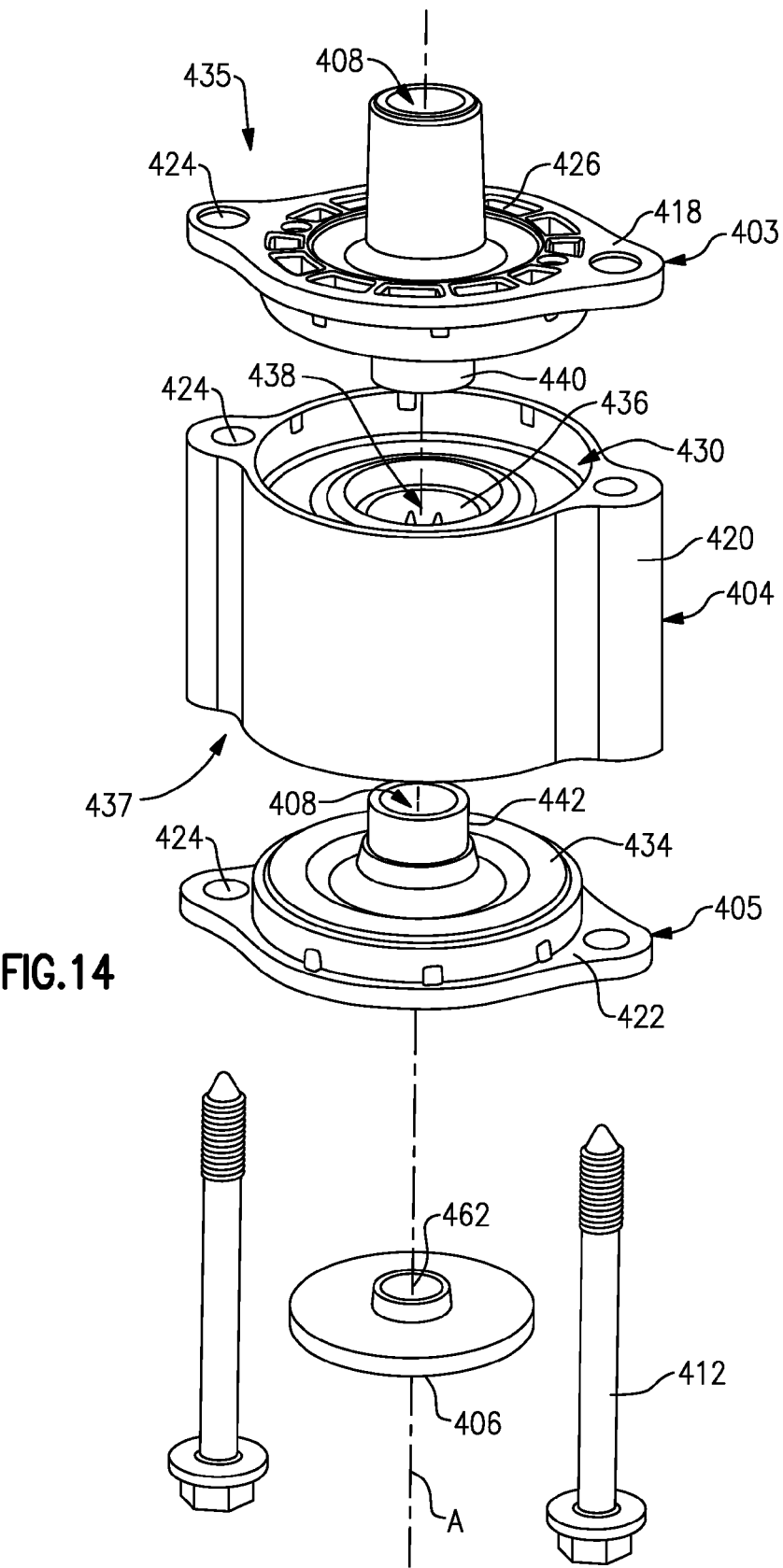
FIG. 14 is an exploded view of the mount assembly of FIG. 13.
Figure 15:
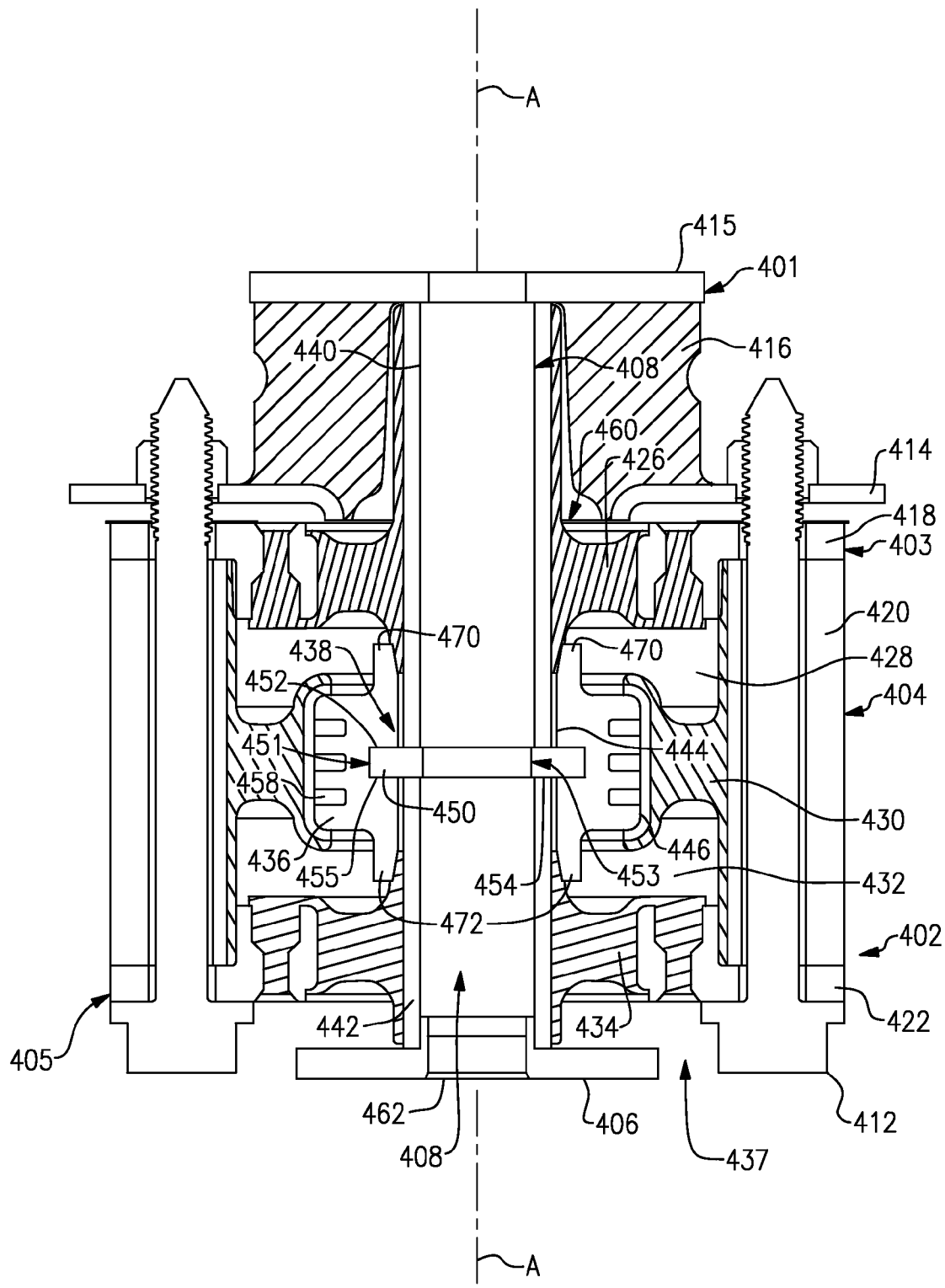
FIG. 15 is a cross-sectional view of the mount assembly of FIG. 13.

FIGS. 13-15 have similar structures, features, and functions to previously described embodiments and may incorporate the features of embodiments described in this disclosure. The body mount assembly 400 includes an upper mount 401 and a lower mount 402 disposed about axis A. Upper mount 401 is disposed on the first end 410 of lower mount 402 and is attached to lower mount 402 via fasteners 412. A first main rubber element 416 is disposed between the base 414 and the upper portion 415 of the upper mount 401. Upper mount 401 includes at least one opening 425 which each receive one of the fasteners 412.

Lower mount 402 includes an upper section 403, central section 404, and lower section 405. The central section 404 is arranged between the upper section 403 and lower section 405 along axis A to form the lower mount 402. Upper section 403 includes an upper housing 418, central section 404 includes a central housing 420, and lower section 405 includes a lower housing 422. At least one opening 424 is disposed at a position radially outward of shaft 408 through each of the upper housing 418, central housing 420, and lower housing 422. The opening 424 is arranged to receive the fastener 412 such that the upper section 403, central section 404, and lower section 405 are attached. Upper mount 401 includes at least one opening 425 to receive the fastener 412 such that the upper mount 401 is attached to the lower mount 402. Openings 425 is aligned with openings 424 to receive the fastener 412.

During assembly of the body mount assembly 400, upper section 403, central section 404, and lower section 405 are aligned and extend along axis A. At least one fastener 412 is inserted in the openings 424 to attach upper section 403, central section 404, and lower section 405. Additionally, upper mount 401 extends along axis A to align with lower mount 402 such that fastener 412 is inserted in openings 425 to attached upper mount 401 and lower mount 402. In the example embodiment, two fasteners 412 are used. In one example, the fasteners 412 are bolts which extend through the openings 424.

Upper section 403 includes a second main rubber element 426 which at least partially defines a first chamber 428 of the lower mount 402. The central section 404 includes a third main rubber element 430 which at least partially defines the first chamber 428 and a second chamber 432. The lower section 405 includes a fourth main rubber element 434 which at least partially defines the second chamber 432. In this example, the second main rubber element 426, the third main rubber element 430, and the fourth main rubber element 434 are arranged such that they do not contact one another. However, other arrangements may be used.

Central section 404 further includes an inertia track 436 which defines an opening 438 to receive a shaft 408 there through. The inertia track 436 includes passage 458 and aids in damping vibrations between the upper end 435 and lower end 437 of the body mount assembly 400. The passage 458 fluidly connects the first chamber 428 and second chamber 432. The inertia track 436 is a movable component that spans between the first chamber 428 and second chamber 432 and is resiliently mounted about an outer peripheral portion of the shaft 408. The second main rubber element 426, the third main rubber element 430, and the fourth main rubber element 434 are formed so that the inertia track 436 may selectively move or deflect and cause a pumping action of fluid through the passage 458 to move fluid between the first chamber 428 and the second chamber 432. In one example, the passage 458 is a serpentine passage. The inertia track 436 may also include the features of any inertia track 436 of the present disclosure.

The shaft 408 includes a first shaft section 440, integral with the upper section 403 and a second shaft section 442 integral with the lower section 405. However, the first shaft section 440 and second shaft section 442 may be integrally formed or independently formed. The shaft 408 extends through the lower mount 402. The shaft 408 extends through opening 438 of the inertia track 436 such that the shaft 408 is disposed at a radially inner surface 444 of the inertia track 436 relative to the opening 438. Inertia track 436 also includes a radially outer surface 446.

An engagement member 450 includes a diametrically outer surface 451 and a diametrically inner surface 453. The diametrically outer surface 451 is disposed at least partially in a groove 455 of the inertia track 436 at the radially inner surface 444 to rigidly couple the engagement member 450 and the inertia track 436 such that the engagement member 450 moves with the inertia track 436 during operation. Engagement member 450 moves with the inertia track 436 in unison such that movement of the inertia track 436 in a direction results in movement of the engagement member 450 in the same direction. The engagement member 450 is disposed an equal distance between upper flanges 470 and lower flanges 472 of the inertia track 436. First shaft section 440 abuts the engagement member 450 on a first side 452 and second shaft section 442 abuts the engagement member 450 on a second side 454 such that the first shaft section 440 and the second shaft section 442 are on opposing sides 452, 454 of the engagement member 450. In this example, the engagement member 450 is annular.

The inertia track 436 includes the upper flanges 470 and lower flanges 472 extending in a generally axial direction along axis A. The second main rubber element 426 of upper section 403 is at least partially disposed between the shaft 408 and upper flanges 470 of the inertia track 436. The second main rubber element 426 is disposed in the upper section 403 and on the first shaft section 440. Similarly, at least a portion of the fourth main rubber element 434 of the lower section 405 is disposed between lower flanges 472 of the inertia track 436 and the shaft 408. The fourth main rubber element 434 is disposed in the lower section 405 and on the second shaft section 442.

The third main rubber element 430 of central section 404 is disposed on the radially outer surface 446 of the inertia track 436 and extends around the entire periphery of the inertia track 436. The third main rubber element 430 and the inertia track 436 separate the first chamber 428 and the second chamber 432. The third main rubber element 430 is disposed in the central housing 420 and extends between the central housing 420 and the inertia track 436 such that the first chamber 428 is sealed from the second chamber 432.

As shown, the first shaft section 440 extends both into the central section 404 of the lower mount 402 and into an opening 460 of the upper mount 401. The second main rubber element 426 is arranged such that during operation, the second main rubber element 426 can contact first main rubber element 416.

In one example, a washer 406 is disposed at a lower end 437 of the lower mount 402 to prevent movement of the upper mount 401 and lower mount 402 during operation. Opening 462 of the washer 406 has a diameter sized to receive the shaft 408.

In one example, the upper housing 418, the central housing 420, and the lower housing 422 are made of the same material, such as aluminum. In one example, the engagement member 450 is a steel ring.

When the first shaft section 440 and second shaft section 442 are inserted into the opening 438 of the inertia track 436, a seal is created between the second main rubber element 426 and the inertia track, and the fourth main rubber element 434 and the inertia track 436. The first chamber 428 and second chamber 432 are sealed on the lower mount 402 and from each other such that fluid is only communicated through the inertia track 436.

Independent axial dynamic tuning, using the fluid effect of the mount, as deemed necessary by the system in which it is installed can be provided while providing mounting through the center of the shaft, and with the inertia track mounted to the shaft. In these designs, the shaft with through fastener or through bolt is allowed to move relative to the outer housing/third molded component. The inertia track therefore becomes the physical member or plunger that actuates the fluid between the upper and lower chambers thereby creating frequency dependent fluid effect damping. An inertial track also pumps resulting in additional viscous damping. The combination of viscous damping and a tuned track (inertia track) to create simultaneous broad-band and resonating fluid damping is believed to be unique, and substantially different than known hydromounts.

These multi-piece designs of the assembly allow a great range of rubber tuning as the upper load bearing mount can use a different rubber hardness and/or compound than that of the lower hydraulic damper. For example, butyl rubber could be used in the load bearing body mount and natural rubber could be used in the hydraulic damper, or vice versa.

A fastener through the center of the mount significantly increases the functionality of the damper. Although these mounts can be used as load bearing mounts, one of the unique characteristics is that the hydromounts could be used in conjunction with a typical shear style body mount in a rebound application. Further applications for these designs as either a load bearing mount, or as an addition to a load bearing mount, are engine mount or suspension mount applications. These designs also reduce the assembly and sealing complexity that would be expected of center fastening, double pumping, hydraulic mounts.

As noted above, the axially damped hydraulic mount uses the inertia track as the fluid actuating plunger and allows a fastener to pass through the center of the mount. This axially damped hydraulic mount uses a configuration that allows for the same triaxial static rates and travels as a conventional elastomeric mount. The present disclosure improves the durability of a hydraulic actuated mount by separating the load bearing portion of the mount from the damping (fluid filled) portion of the mount.

The axially damped, double pumping, hydraulic mount of the present disclosure can be used in applications where higher levels of damping than conventional elastomeric mounts are capable of are required. The embodiments of the present disclosure can be used in applications where the only means of fastening the mount to the system in which it is being used is through the center of the mount. The mount can be used in packaging situations where other mounts would not otherwise fit.

Additional tuning flexibility is achieved because the three legs or main rubber elements (MRE) can be tuned independently of each other. It will be further understood by those skilled in the art that the shape or conformation of the mount need not be round but can also adopt other shapes, e.g., rectangular, square, etc.

This hydraulic mount design works well in shear style body mount designs because it allows the hydraulic damping portion of the body mount to be located under the "pedestal" or frame side bracket (see FIGS. 4 and 5 where the hydromount 104 is located beneath the pedestal). This allows for considerable design flexibility for the frame and body structures. It will be appreciated, however, that the hydraulic portion of the mount can also be installed below the vehicle frame bracket.

The damper of this disclosure also allows for independent axial dynamic tuning, using the fluid effect of the mount as deemed necessary by the system into which it is installed.

Another key feature of the present disclosure is the ease of assembly and unique sealing method for a double pumping hydraulic mount. The damper portion of the mount is sealed with a single crimp, which compresses the seal on the inner molded components. A tube is pressed over the inner shaft to compress the seals at the inertia track. An alternate sealing method comprises forming the inertia track from two stamped metal pieces and using the outer metal of the center molded component to crimp the upper and lower molded components. A tube press-fit over shaft seals the inertia track.

The invention has been described with reference to the preferred embodiment. Modifications and alterations will occur to others upon reading and understanding this specification. It is intended to include all such modifications and alterations in so far as they come within the scope of the appended claims or the equivalents thereof.

What is claimed is:

1. A hydromount assembly comprising:
a first chamber and a second chamber;
an inertia track separating the first chamber and the second chamber, the inertia track having a central opening and including, relative to the central opening, a radially inner surface and a radially outer surface, the inertia track having a passage between the radially inner surface and the radially outer surface that fluidly connects the first chamber and the second chamber;
an engagement member at least partially disposed in the central opening of the inertia track and rigidly coupled to the inertia track to move in unison with the inertia track;
a shaft extending through the central opening, the shaft including a first shaft section and a second shaft section, the first shaft section contacting the engagement member on a first axial side and the second shaft section contacting the engagement member on a second, opposite axial side to sealingly engage the inertia track; and
a first elastomeric element on the first shaft section and a second elastomeric element on the second shaft section, wherein the first elastomeric element and the second elastomeric element are arranged such that they do not contact one another.

2. The hydromount assembly of claim 1, wherein the first elastomeric element is at least partially disposed between the first shaft section and the inertia track and the second elastomeric element is at least partially disposed between the second shaft section and the inertia track.

3. The hydromount assembly of claim 1, wherein the passage is a serpentine passage.

4. The hydromount assembly of claim 1, wherein the first shaft section and the second shaft section are independently formed and free of contact with each other.

5. The hydromount assembly of claim 1, wherein the inertia track consists of metal.

6. The hydromount assembly of claim 1, wherein the engagement member is annular and includes a diametrically outer surface disposed at least partially in a groove of the inertia track.

7. A hydromount assembly comprising:
an upper mount having a first elastomeric element;
a lower mount including an upper portion, a central portion including an engagement member, and a lower portion, the lower mount including a shaft, wherein the upper portion includes a first shaft section, and the lower portion includes a second shaft section, wherein the first shaft section and second shaft section abut the engagement member;
an inertia track having a passage fluidly connected with a first chamber and a second chamber, wherein the inertia track separates the first chamber and the second chamber, the inertia track having a first central opening about an axis, wherein the shaft extends through the first central opening, wherein the engagement member is disposed in the inertia track between the first shaft section and the second shaft section; and
at least one fastener radially outward of the inertia track, the at least one fastener is disposed through at least one opening in each of the lower portion, central portion, upper portion, and upper mount such that the upper mount and lower mount are attached.

8. The hydromount assembly of claim 7, wherein at least one of the upper portion, central portion, and lower portion having a second, different elastomeric element.

9. A hydromount assembly comprising;
an upper mount having a first elastomeric element;
a lower mount including an upper portion, a central portion, and a lower portion, the lower mount including a shaft, wherein the upper portion includes a first shaft section, the lower portion includes a second shaft section, and the central portion includes an engagement member, wherein at least one of the upper portion, central portion, and lower portion having a second, different elastomeric element, wherein the upper portion has the second elastomeric element, the central portion has a third, different elastomeric element, and the lower portion has a fourth, different elastomeric element, wherein the second elastomeric element, the third elastomeric element, and the fourth elastomeric element are free of contact with each other;
an inertia track having a passage fluidly connected with a first chamber and a second chamber, wherein the inertia track separates the first chamber and the second chamber, the inertia track having a first central opening about an axis, wherein the shaft extends through the first central opening, wherein the engagement member is disposed in the inertia track between the first shaft second and the second shaft section; and
at least one fastener radially outward of the inertia track, the at least one fastener is disposed through at least one opening in each of the lower portion, central portion, upper portion, and upper mount such that the upper mount and lower mount are attached.

10. The hydromount assembly of claim 9, wherein the second elastomeric element is bonded to the first shaft section, the fourth elastomeric element is bonded to the second shaft section, and third elastomeric element is bonded to the inertia track.

11. The hydromount assembly of claim 9, wherein the upper portion includes an upper housing bonded to the second elastomeric element, the central portion includes a central housing bonded to the third elastomeric element, and the lower portion includes a lower housing bonded to the fourth elastomeric element.

12. The hydromount assembly of claim 9, wherein the third elastomeric element extends from the inertia track to a housing of the central portion such that the first chamber is sealed from the second chamber.

13. The hydromount assembly of claim 7, wherein the first shaft section and the second shaft section sealingly engage the inertia track.

14. The hydromount assembly of claim 7, wherein the inertia track consists of metal.

15. The hydromount assembly of claim 7, wherein the first shaft section is integral with the upper portion and the second shaft section is integral with the lower portion.

16. The hydromount assembly of claim 7, wherein the first shaft section extends into both the central portion of the lower mount and into an opening of the upper mount.

17. The hydromount assembly of claim 7, wherein a washer is disposed at an end of the lower mount opposite the upper mount, wherein the washer is configured to prevent movement of the upper mount and the lower mount during operation.

18. The hydromount assembly of claim 17, wherein the washer comprises an opening sized to receive the shaft.

19. The hydromount assembly of claim 1, further comprising:
an elastomeric element disposed directly on the radially outer surface of the inertia track.

* * * * *